US008013714B2

(12) United States Patent  (10) Patent No.: US 8,013,714 B2
Qi  (45) Date of Patent: *Sep. 6, 2011

(54) RFID SENSOR USING PULSE PROCESSING

(76) Inventor: Baohua Qi, Columbus, IN (US)

( * ) Notice: Subject to any disclaimer, the term of this patent is extended or adjusted under 35 U.S.C. 154(b) by 1021 days.

This patent is subject to a terminal disclaimer.

(21) Appl. No.: 11/728,137

(22) Filed: Mar. 24, 2007

(65) Prior Publication Data

US 2007/0222583 A1  Sep. 27, 2007

Related U.S. Application Data

(60) Provisional application No. 60/786,193, filed on Mar. 27, 2006.

(51) Int. Cl.
 *H04Q 5/22* (2006.01)
(52) U.S. Cl. .......... 340/10.1; 340/10.3; 340/539.26; 340/572.1; 340/445; 380/37
(58) Field of Classification Search ........... 340/539.26, 340/16–17, 10.41, 539.11–539.12, 22–29, 340/572.7, 870.1–870.26, 572.1–572.4, 445–448, 340/539.1; 380/37
See application file for complete search history.

(56) References Cited

U.S. PATENT DOCUMENTS

| | | | | | |
|---|---|---|---|---|---|
| 3,029,310 A | * | 4/1962 | Heiser | ............................ | 370/430 |
| 3,775,751 A | * | 11/1973 | Anderson | ...................... | 370/465 |
| 3,864,578 A | * | 2/1975 | Lackey | ......................... | 307/10.1 |
| 4,006,477 A | * | 2/1977 | Yost et al. | ....................... | 342/51 |
| 4,075,632 A | * | 2/1978 | Baldwin et al. | ................. | 342/51 |
| 4,241,320 A | * | 12/1980 | Fausone et al. | ................. | 333/18 |
| 4,901,351 A | * | 2/1990 | Tanaka et al. | ................. | 380/223 |
| 4,916,643 A | * | 4/1990 | Ziegler et al. | ................. | 702/188 |
| 4,979,124 A | * | 12/1990 | Sachse et al. | ................... | 702/38 |
| 5,335,664 A | * | 8/1994 | Nagashima | .................... | 600/508 |
| 5,345,231 A | * | 9/1994 | Koo et al. | ................ | 340/870.31 |
| 5,422,930 A | * | 6/1995 | McDonald et al. | ........... | 455/411 |
| 5,481,262 A | * | 1/1996 | Urbas et al. | .............. | 340/870.17 |
| 5,602,538 A | * | 2/1997 | Orthmann et al. | ........... | 340/10.2 |
| 5,661,651 A | * | 8/1997 | Geschke et al. | ................ | 701/88 |
| 5,760,577 A | * | 6/1998 | Shizuya | .................... | 324/207.16 |
| 5,777,557 A | * | 7/1998 | Fayfield | ........................ | 340/635 |
| 5,794,151 A | * | 8/1998 | McDonald et al. | ........... | 455/454 |
| 6,044,333 A | * | 3/2000 | Stobbe et al. | ................. | 702/106 |
| 6,049,280 A | * | 4/2000 | Andersson | ................. | 340/573.3 |
| 6,172,609 B1 | * | 1/2001 | Lu et al. | ..................... | 340/572.4 |
| 6,198,785 B1 | * | 3/2001 | Flynn | ............................ | 375/377 |
| 6,249,212 B1 | * | 6/2001 | Beigel et al. | ................. | 340/10.34 |
| 6,720,866 B1 | * | 4/2004 | Sorrells et al. | ............... | 340/10.4 |
| 6,756,856 B2 | * | 6/2004 | Song et al. | ..................... | 331/176 |
| 7,040,139 B2 | * | 5/2006 | Sunshine | ....................... | 73/23.2 |
| 7,397,370 B2 | * | 7/2008 | Bratkovski | ............... | 340/539.26 |
| 7,520,374 B2 | * | 4/2009 | Martin et al. | .................. | 194/317 |
| 7,619,346 B2 | * | 11/2009 | Yazdi | ............................ | 310/307 |
| 2001/0004236 A1 | * | 6/2001 | Letkomiller et al. | ....... | 340/572.1 |
| 2002/0036569 A1 | * | 3/2002 | Martin | ....................... | 340/573.1 |
| 2002/0101769 A1 | * | 8/2002 | Garverick et al. | ............ | 365/200 |
| 2003/0009202 A1 | * | 1/2003 | Levine | ............................ | 607/58 |
| 2003/0052781 A1 | * | 3/2003 | Iwasawa et al. | .............. | 340/556 |

(Continued)

*Primary Examiner* — Benjamin C Lee
*Assistant Examiner* — Quang D Pham (57) ABSTRACT

A radio frequency identification device having sensing elements incorporated in its tags, and the sensing value determines the width of a sensing pulse in its RFID code. Through a pulse-processing unit, during communication, digital sensing values are obtained by measuring the width of the sensing pulse. Since only discrete signals exist, the tag device is insensitive to the fluctuation in its power supply voltage, which is derived from a continuous wave RF carrier.

14 Claims, 8 Drawing Sheets

U.S. PATENT DOCUMENTS

| | | | |
|---|---|---|---|
| 2003/0133435 A1* | 7/2003 | Friedrich | 370/349 |
| 2004/0011194 A1* | 1/2004 | Lederer et al. | 92/5 R |
| 2004/0036626 A1* | 2/2004 | Chan et al. | 340/870.17 |
| 2004/0183572 A1* | 9/2004 | Bohl et al. | 327/110 |
| 2005/0137652 A1* | 6/2005 | Cauller et al. | 607/60 |
| 2005/0285726 A1* | 12/2005 | Haswell et al. | 340/445 |
| 2006/0114120 A1* | 6/2006 | Goldstone | 340/825.72 |
| 2006/0122473 A1* | 6/2006 | Kill et al. | 600/300 |
| 2006/0145881 A1* | 7/2006 | Sakatani et al. | 340/679 |
| 2007/0018837 A1* | 1/2007 | Mizutani et al. | 340/635 |
| 2007/0229228 A1* | 10/2007 | Yamazaki et al. | 340/10.34 |
| 2007/0229271 A1* | 10/2007 | Shionoiri et al. | 340/572.1 |
| 2007/0229281 A1* | 10/2007 | Shionoiri et al. | 340/572.7 |
| 2007/0285254 A1* | 12/2007 | Usami | 340/572.7 |
| 2008/0055047 A1* | 3/2008 | Osada et al. | 340/10.1 |
| 2008/0100435 A1* | 5/2008 | Jorgenson et al. | 340/539.22 |
| 2008/0129475 A1* | 6/2008 | Breed et al. | 340/438 |
| 2008/0136646 A1* | 6/2008 | Friedrich | 340/572.7 |
| 2008/0191866 A1* | 8/2008 | Falck et al. | 340/539.12 |
| 2008/0210762 A1* | 9/2008 | Osada et al. | 235/492 |
| 2008/0252254 A1* | 10/2008 | Osada | 320/108 |

* cited by examiner

RFID SENSOR USING PULSE PROCESSING

This present application claims priority from U.S. provisional application No. 60/786,193 having the same tile as the present invention and filed on Mar. 27, 2006.

This invention relates to radio frequency identification (RFID) devices, and more particularly, to RFID based sensors, the data acquired from which is read by an interrogator.

FIELD OF THE INVENTION

Background of the Invention

Radio frequency identification devices generally comprise RF tags and a read-out device that is usually called interrogator or integration reader. The interrogator generates a continuous wave (CW) RF carrier that is used by the tag as a power source to modify the amplitude of the CW carrier by loading and unloading its antenna with stored digital codes. The modulated backscattering signals are then reflected back to the interrogator and demodulated therein, thereby, the information stored in tags is read by the interrogator. RFIDs tags can be read through water, paint, dirt, wood, plastics, and human bodies. They are used broadly in security systems, electronic access cards, and inventory management systems.

RFIDs can also be used with sensors. In this application, typically, physical or chemical properties of an object, such as temperature, humidity, pressure, speed, pH, and acceleration, are detected as analog electrical signals. Then an Analog to Digital Converter (ADC) is employed to convert the analog signals into digital signals, which are read by the interrogator during a sampling cycle. Since an ADC compares the analog input voltage with a reference voltage in generating digital signals, to obtain an accurate result, a high precision and stable reference voltage source is needed, and the variation of input voltage during sampling should be minimized. However, the power supply of RFID tags is usually generated by converting CW to direct current (DC). It is not easy to obtain a steady and precise reference voltage. Additionally, sensing signal conditioning and analog to digital signal conversion need extra power consumption. As a result, a more powerful CW or closer operation range is required.

It is an object of the present invention to provide a RFID tag that is able to work with an interrogator in converting sensing values obtained from a sensor into digital signals without using ADCs, so that the signal acquisition is not sensitive to variations in power supply.

Another object of the present invention is to provide a means to transmit the sensing information with identification (ID) codes.

BRIEF SUMMARY OF THE INVENTION

The present invention provides a sensing device based on RFID technology. In this device, sensing elements are incorporated in RFID tags, and sensing information is sent back to the interrogator with ID codes. Different from other devices converting voltage level obtained from a sensor into digital signals, in the present invention, pulse width is used in sensing the objects' physical or chemical properties. Pulse signals that change with the sensing values are digitized in the interrogator during communication rather than being converted into digital signals in tags, thereby no dedicated ADC and its complex peripheral circuits are needed, and a faster and more power economical process is enabled.

In one embodiment of the present invention, the tag device has a monostable multivibrator. Triggered by a synchronous signal, the monostable multivibrator generates a pulse, the width of which changes with the sensing values obtained from a resistive sensor or a capacitive sensor. This sensing pulse is then concatenated with an ID code sequence generated with a memory array. The ID code can be either leading the sensing pulse or behind it (in a more complex circuit, the sensing pulse can be inserted in ID code), and in the ID code, the sensor array information, such as sensor type, sensor location, sensing baseline, and sensing range, can be included. The result code sequence is then modulated and transmitted by the tag device by loading and unloading its antenna. Features and advantages of the invention will be apparent from the following description of presently preferred embodiments, given for the purpose of disclosure and taken in conjunction with the accompany drawings.

DETAILED DESCRIPTION OF THE INVENTION

Figure 1:
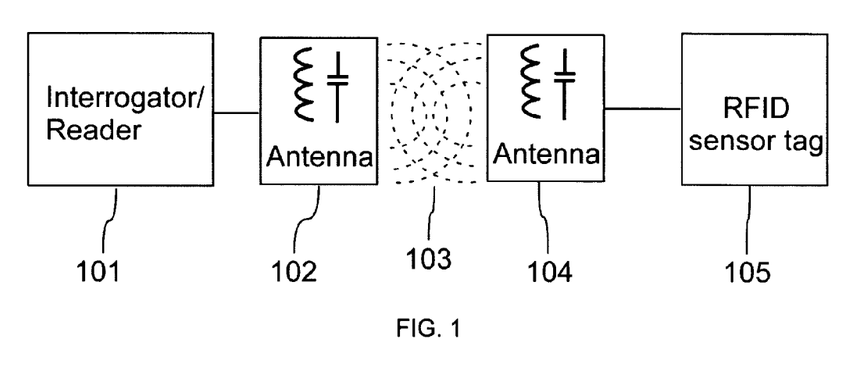
FIG. 1 is a block diagram of an RFID sensing system including a tag device and an interrogator device.

As depicted in FIG. 1, the RFID sensing system comprises an interrogator device 101 with an antenna 102 and an RFID sensor tag device 105 with an antenna 104. The RFID sensor tag device 105 has no internal power source. It gains power from a near field or far field RF 103 generated by the interrogator device 101. After the tag device 105 is powered, it then changes the amplitude of the RF carrier with a sequence of code stored inside the device. The change in amplitude is detected by the interrogator device 101 and the pattern of the amplitude change, which contains the code information, is examined therein. The demodulated code is used for further data processing.

Figure 2:
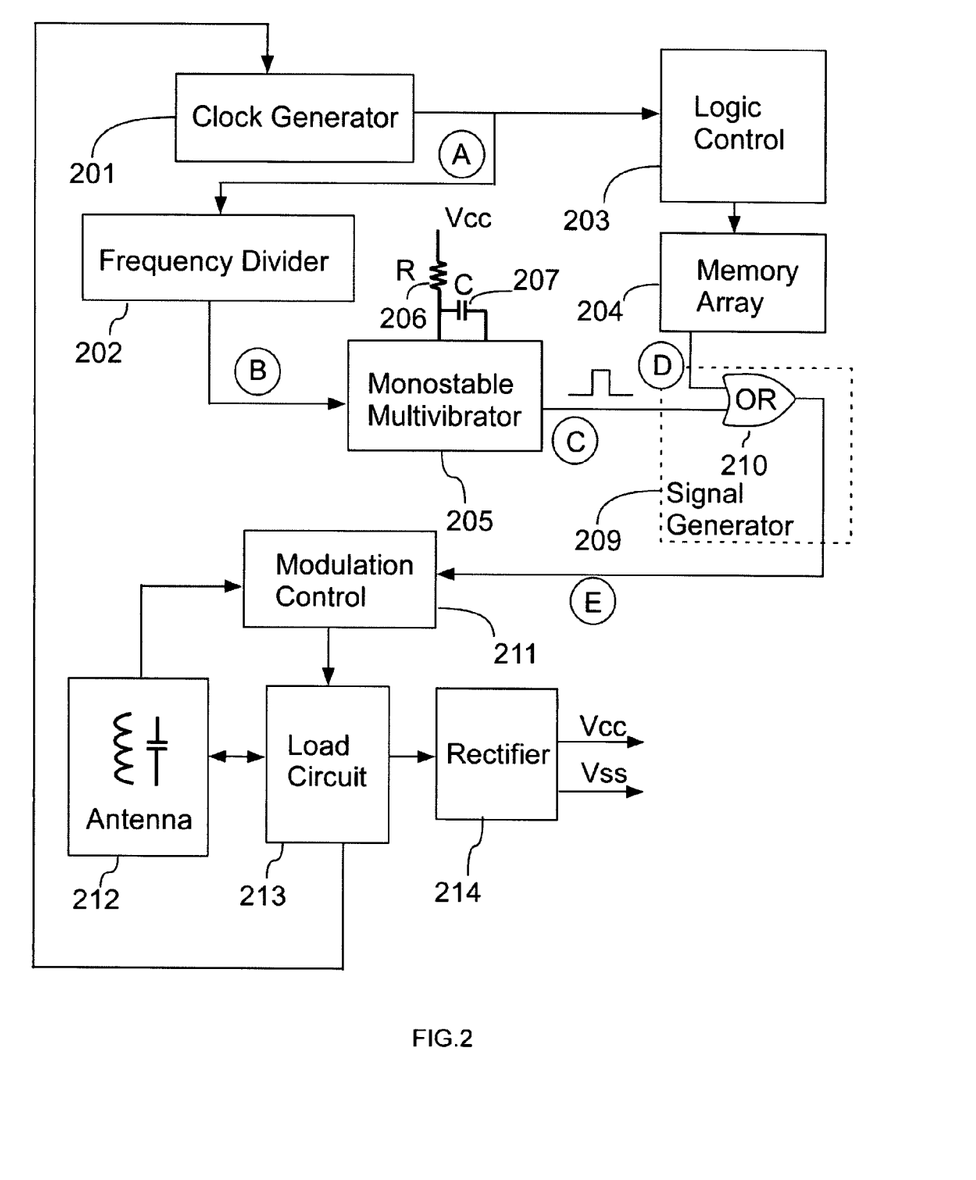
FIG. 2 illustrates a schematic block diagram of an RFID tag device with sensor elements included.

Referring to FIG. 2, in an embodiment of the RFID sensor tag device, a clock generator 201 is employed to provide a synchronous signal for a logic control block 203 to read the RFID code from a memory array 204. The synchronous signal is also used for generating a trigger signal for a monostable multivibrator 205 through a frequency divider 202. At rising edge or falling edge of the trigger signal, the monostable multivibrator 205 generates a pulse with its width determined by a resistor 206 and a capacitor 207, either of which could have sensor elements included. The pulse signal from the monostable multivibrator 205 is then concatenated with the RFID code signal provided by the memory array 204 in a signal generator 209, which in this embodiment is an OR gate 210. The result signal is then modulated on the RF carrier signal obtained from an antenna 212 through a modulation control block 211 and a load circuit 213. The power supply for the RFID tag is generated by a rectifier 214 from the carrier signals passing through the load circuit 213.

Figure 3:
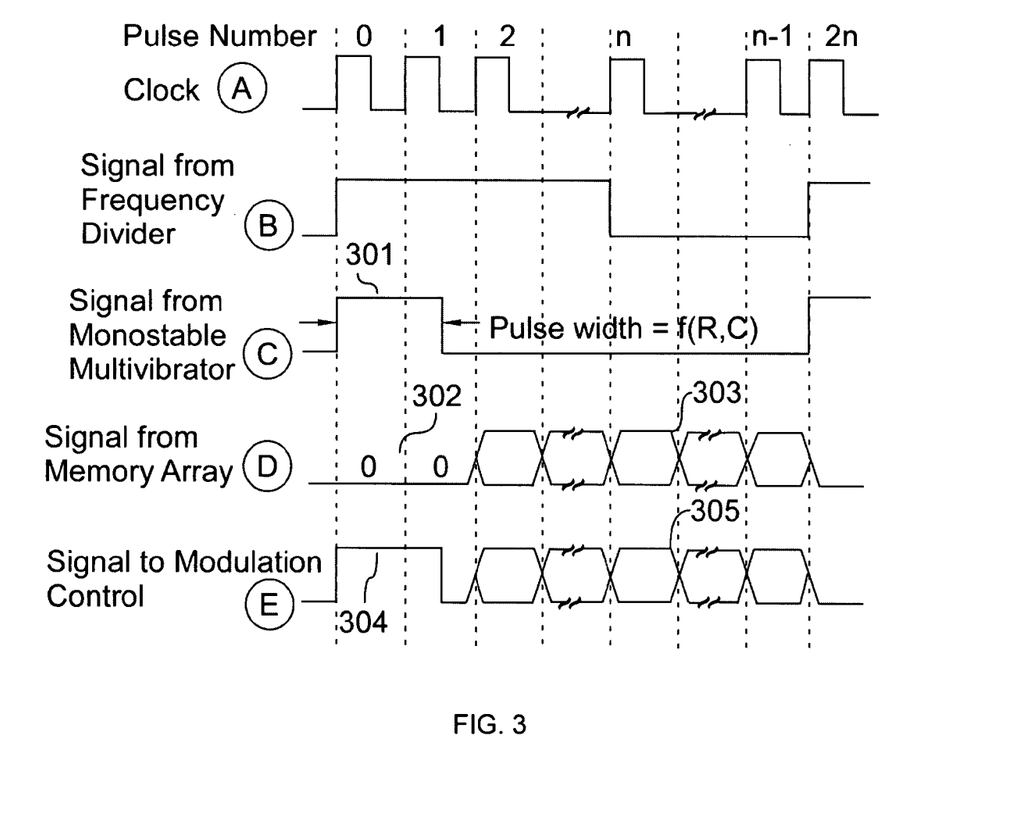
FIG. 3 is a timing chart for illustrating the generation of an RFID code sequence including a sensing pulse and an ID code.
Figure 4:
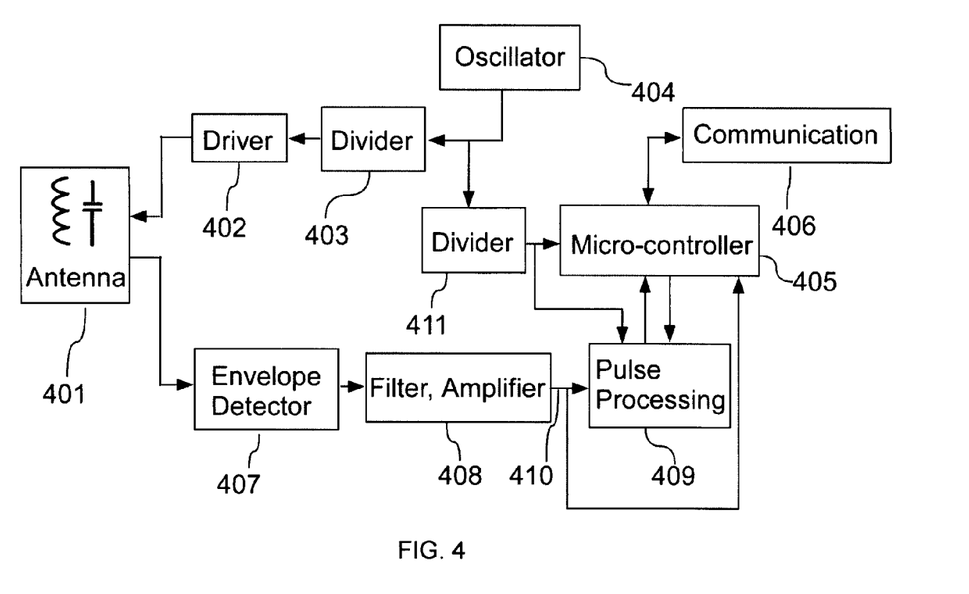
FIG. 4 shows a schematic block diagram of an RFID interrogator device.

The RFID code stored in the memory array 204 include two sections: leading code, which comprises a series of zeros, and ID code, which includes the ID of the tag. If the RFID code has $2^n$ bits, then the frequency divider 202 should have n registers (frequency is divided by $2^n$), where n is an integral. When a capacitive sensor is included in the capacitor 207 (or a resistive sensor is included in the resistor 206), the resistor 206 (or capacitor 207) should be selected to make the width of the pulse generated by the monostable multivibrator shorter than that of the leading code. For example, if the pulse width t is a function of the values of the resistor 206 (R) and the capacitor 207 (C):

$$t=f(R,C),$$

then the maximum pulse width $t_{max}$ in sensing range should be shorter than the width of the leading code $t_c$;

$$t_c=m/f_c,$$

where m is the number of bits in the leading code and $f_c$ is the clock frequency. The signal waveforms in FIG. 2 are depicted in FIG. 3. Triggered by the synchronous signal B, the frequency of which is $f_c/2^n$, the signal C generated by the monostable multivibrator 205 includes a sensing pulse 301. Its pulse width is f(R,C). Synchronized by the clock signal A, the RFID code signal D is generated through the memory array 204. The low level leading code signal 302 lasts for $t_c$ seconds, and $$t_c > f(R,C),$$

while the overall time of the ID code signal 303 is $(2n-m)/f_c$. In the signal generator 209, the RFID code signal D and the sensing pulse signal C are concatenated in the OR gate 210. The result signal E has a pulse 304 and an ID code signal 305. The width of the pulse 304 changes with the values of the sensing elements in the RFID tag, The signals generated by the RFID tag are then received by an interrogator. As shown in FIG. 4, in the interrogator, signals acquired from an antenna 401 are sent to an envelope detector 407, where the code signals are separated from the carrier. The output signals from the envelope detector 407 pass through a filter and amplifier circuit 408. The result signals 410 are processed in a pulse-processing block 409, where the pulse width of the sensing pulse is digitized. A microcontroller 405 reads ID code and calculates the sensing value, while a circuit 406 is used for the communication between the microcontroller 405 and a host computer (not shown in the figure). The clock pulses for the microcontroller 405 and the pulse processing circuit 409 are provided by an oscillator 404 through a frequency divider 411. RF carrier in the interrogator is generated by the oscillator 404 through a frequency divider 403 and a driver 402.

Figure 5:
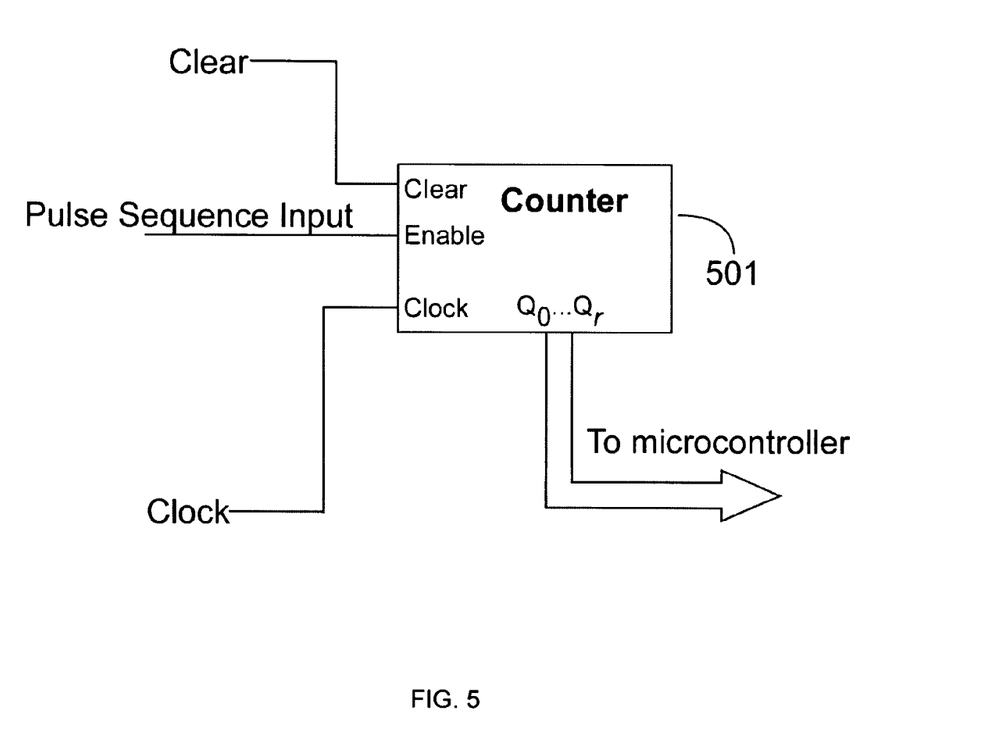
FIG. 5 shows a realization of the pulse processing block in FIG. 4.
Figure 6:
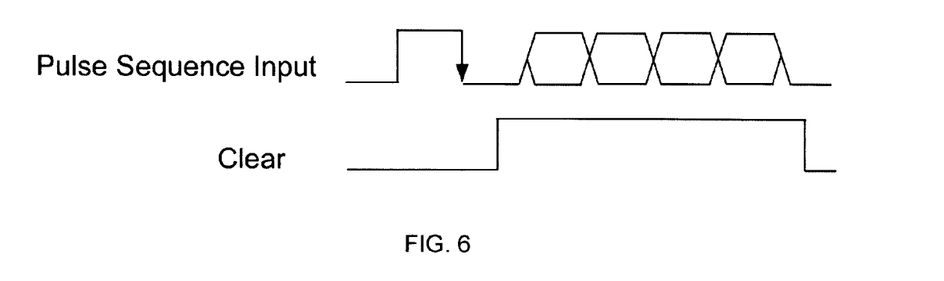
FIG. 6 is a timing chart for the pulse processing.

An example of the pulse-processing block 409 in the interrogator is shown in FIG. 5, where it is realized by a counter 501. In the circuit, the "Clear" signal is provided by the microcontroller 405. The Pulse Sequence is the "Signal to Modulation Control" E (FIG. 3), and the "Clock" signal is generated by the oscillator 404 through a divider 411. The output signals $Q_0$ to $Q_r$ of the counter 501 are sent to the microcontroller 405. Referring to the timing chart, which is shown in FIG. 6, before the sensing pulse 304 appears in the signal E (FIG. 3), the Clear signal is at low level, and the counting value is set to 0. When a sensing pulse is received, the high level signal enables the counter, which keeps counting up until a falling edge of the sensing pulse appears. Then, an interrupt is trigged for the microcontroller 405 and the microcontroller reads the counting value in its interrupt service routine and clears the counter for the next code reading. Since the counter only counts during the sensing pulse period, the counting value is a measure of the pulse width.

Figure 7:
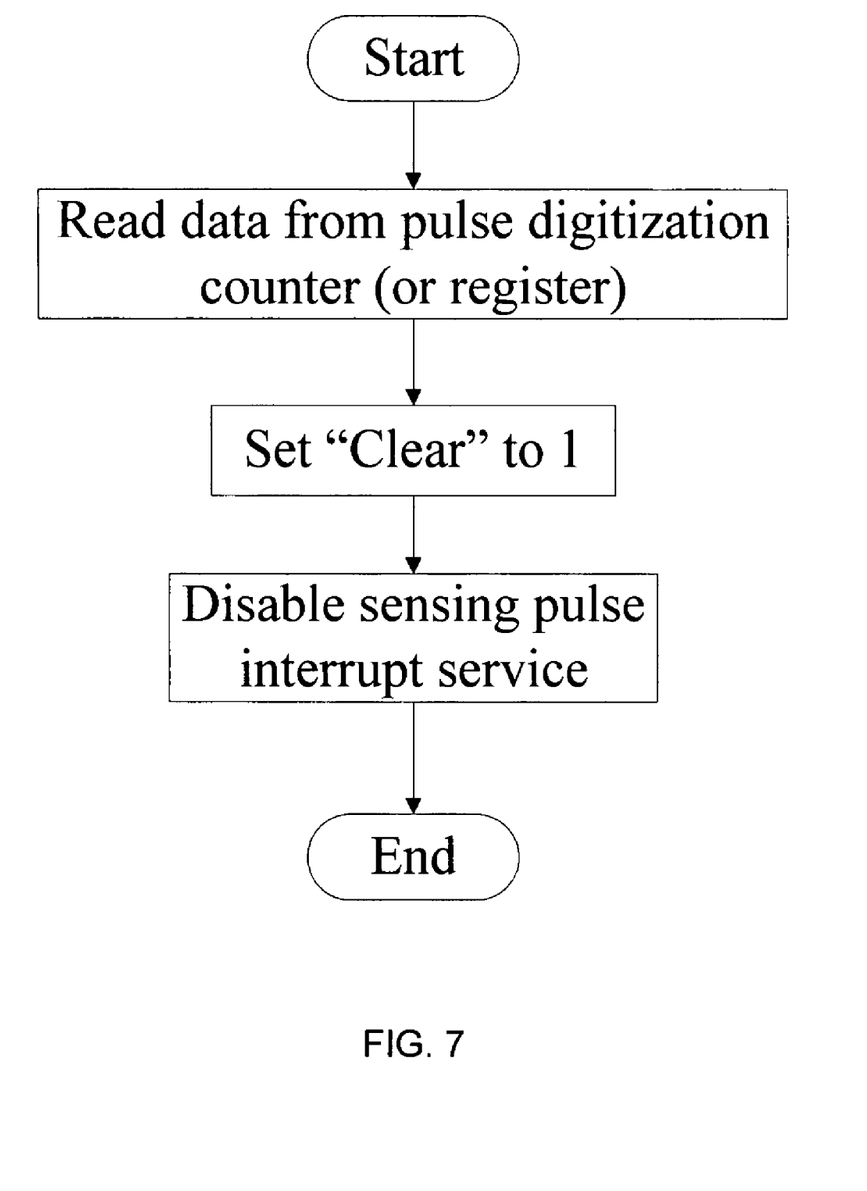
FIG. 7 is a flow chart of an interrupt service routine used for detecting sensing pulses.

The flow chart for an interrupt service routine example is depicted in FIG. 7. When the interrupt service program starts, it reads the counting value. Before the interrupt service routine ends, the counter is cleared and disabled by setting the Clear signal to 1, and the sensing pulse interrupt service is disabled (this interrupt service will be enabled in the main routine after the communication process is complete), so that it will not be triggered by the ID code pulses. In addition to a dedicated counter, the pulse processing can also be realized by using the microcontroller 405 directly based on timer interrupts. Some standard pulse measuring routines can be employed for digitizing the pulse width.

Figure 8:
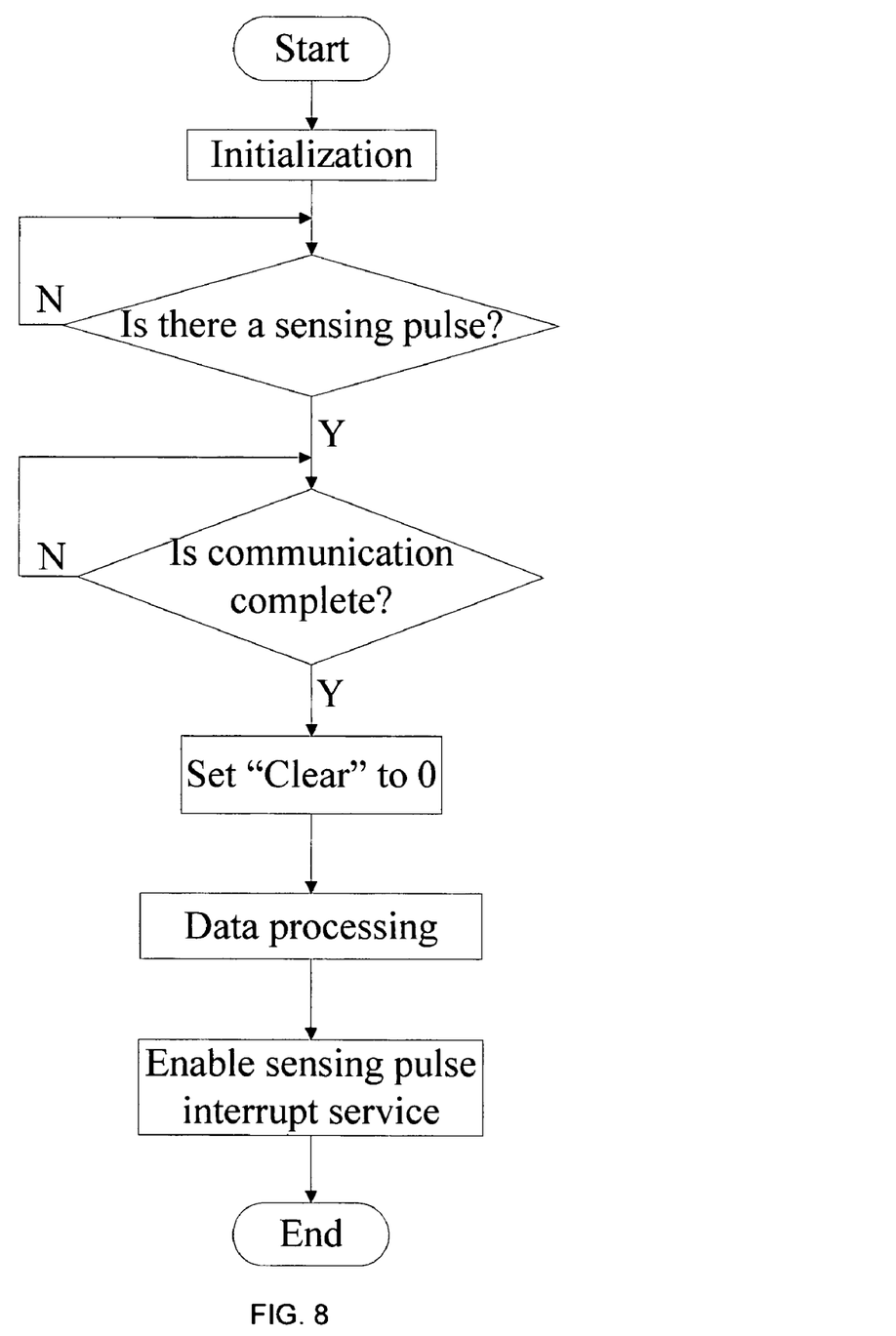
FIG. 8 is a flow chart of a main routine used by the RFID interrogator device.

The flow chart of a main routine example is shown in FIG. 8. During initialization, the sensing pulse interrupt service is enabled, and then the program waits for a sensing pulse to be detected by examining if the interrupt service is disabled (this interrupt service is disabled after a sensing pulse is detected). When a sensing pulse is received, a communication process for detecting ID code starts. The ID code can be read using a standard serial communication program. After the ID code communication is complete, the program sets the Clear signal (FIG. 5) to 0 for clearing the pulse-processing counter 501, and the sensing value is calculated during data processing. Before the program ends, the sensing pulse interrupt service is enabled for the next interrogation.

The invention claimed is:

1. A radio frequency identification tag device with sensors incorporated, comprising:
    a clock generator;
    a sensing pulse generator with sensing elements incorporated for generating sensing pulses, at least one of which has its pulse width changing with sensing values obtained from said sensing elements;
    a logic circuit for generating a binary code sequence signal, which includes a blank code and an identification code containing information about said sensing elements;
    a signal generator that generates a mixed code sequence by concatenating said sensing pulses with said binary code sequence signal through a logic operation of said blank code and said sensing pulses;
    a radio frequency tuned circuit;
    a circuit for loading and unloading said radio frequency tuned circuit;
    a circuit for providing power to said radio frequency identification tag device by converting radio frequency continuous wave signals into direct current power.

2. The radio frequency identification tag device according to claim 1, wherein said sensing pulse generator includes at least one monostable multivibrator.

3. The radio frequency identification tag device according to claim 2, wherein said monostable multivibrator includes a resistive sensor.

4. The radio frequency identification tag device according to claim 2, wherein said monostable multivibrator includes a capacitive sensor.

5. The radio frequency identification tag device according to claim 1, wherein said logic circuit includes a memory array.

6. The radio frequency identification tag device according to claim 5, wherein values of said binary code are stored in said memory array.

7. A radio frequency interrogator device, comprising:
    a circuit that detects RFID signals, which include sensing pulses, at least one of which has its pulse width changing with sensing values obtained from sensor elements in a radio frequency tag device, and a binary ID code sequence signal generated by said radio frequency tag device, wherein said RFID signals are generated by concatenating said sensing pulses with said binary ID code sequence signal through a logic operation of a blank code and said sensing pulses, wherein said binary ID code signal includes said blank code and an identification code of said radio frequency tag device;

a pulse processing unit for measuring the width of said sensing pulses in said RFID signals;

a serial communication unit for obtaining digital information from said binary ID code sequence signal;

a sensing value processing unit that calculates sensing values based on the pulse width measured by said pulse processing unit and the information carried by said binary ID code sequence signal;

a continuous wave generation circuit.

8. The radio frequency interrogator device according to claim 7, wherein said pulse processing includes a counter.

9. The radio frequency interrogator device according to claim 7, further comprising a microcontroller.

10. The radio frequency interrogator device according to claim 9, wherein said pulse processing unit includes a routine in said microcontroller.

11. The radio frequency interrogator device according to claim 9, wherein said sensing value processing unit is a routine in said microcontroller.

12. A system for identifying and reading a sensor value, comprising:

at least one radio frequency identification tag device having a clock generator, a sensing pulse generator with sensing elements incorporated for generating sensing pulses, at least one of which has its pulse width changing with sensing values obtained from said sensing elements, a logic circuit for generating a binary code sequence signal, which includes a blank code and an identification code containing information about said sensing elements, a signal generator that generates a mixed code sequence by concatenating said sensing pulses with said binary code sequence signal through a logic operation of said blank code and said sensing pulses, a radio frequency tuned circuit, a circuit for loading and unloading said radio frequency tuned circuit, and a circuit for providing power to said radio frequency identification tag device by converting radio frequency continuous wave signals into direct current power;

a radio frequency interrogator device having a circuit that detects said mixed code sequence generated by said radio frequency tag device, a pulse processing unit for measuring the width of said sensing pulses, a serial communication unit for obtaining digital information from said binary code sequence signal, a sensing value processing unit that calculates sensing values based on the pulse width measured by said pulse processing unit and the information carried by said binary code sequence signal, and a continuous wave generation circuit;

said continuous wave generated by said radio frequency interrogator device has a frequency compatible with said tuned circuit.

13. The system for identifying and reading sensor values according to claim 12, wherein at least one of said sensing pulses is generated by a monostable multivibrator.

14. The system for identifying and reading sensor values according to claim 12, wherein said serial communication unit includes a routine in a microcontroller.

* * * * *